(12) United States Patent
Wilson

(10) Patent No.: US 7,219,905 B1
(45) Date of Patent: May 22, 2007

(54) REMOVABLE SIDE RACKS FOR A MOVING DOLLY

(76) Inventor: Vern A. Wilson, 404 Spruce Ave., No. 2, South San Francisco, CA (US) 94080

( * ) Notice: Subject to any disclaimer, the term of this patent is extended or adjusted under 35 U.S.C. 154(b) by 0 days.

(21) Appl. No.: 11/435,706

(22) Filed: May 17, 2006

(51) Int. Cl.
*B62B 5/00* (2006.01)
(52) U.S. Cl. .................. 280/79.7; 280/79.3
(58) Field of Classification Search ......... 280/79.11, 280/79.7, 79.3; 16/422, DIG. 24; 211/101, 211/106.01, 208; 403/375
See application file for complete search history.

(56) References Cited

U.S. PATENT DOCUMENTS

| | | | |
|---|---|---|---|
| 1,836,362 A | 12/1931 | Crowley | |
| 2,535,457 A * | 12/1950 | Roberts | 280/47.34 |
| 3,240,516 A | 3/1966 | Barish et al. | |
| 3,841,651 A * | 10/1974 | Bigney | 280/47.16 |
| 4,165,088 A * | 8/1979 | Nelson | 280/47.35 |
| 4,236,844 A | 12/1980 | Mantele | |
| 4,431,329 A | 2/1984 | Baitelle | |
| 4,458,906 A * | 7/1984 | Lamson | 280/47.34 |
| 4,488,733 A * | 12/1984 | Hellsten | 280/47.16 |
| 4,793,624 A | 12/1988 | Mace | |
| 4,921,264 A | 5/1990 | Duffy | |
| 5,037,117 A | 8/1991 | Hershberger | |
| 5,092,551 A | 3/1992 | Meier | |
| 5,163,695 A | 11/1992 | Pakowsky | |
| D333,200 S | 2/1993 | Berrian | |
| 5,330,064 A | 7/1994 | Hall | |
| 6,109,846 A | 8/2000 | Davis et al. | |
| 6,182,937 B1 * | 2/2001 | Sanderse | 248/466 |
| 6,206,385 B1 * | 3/2001 | Kern et al. | 280/47.35 |
| 6,308,969 B1 * | 10/2001 | Young | 280/79.7 |
| 6,450,514 B1 * | 9/2002 | Ronca | 280/79.11 |
| 6,575,653 B1 | 6/2003 | Kräuter | |
| 6,729,632 B2 * | 5/2004 | Ferrigan | 280/79.7 |
| 6,824,152 B1 | 11/2004 | Scott | |
| 6,902,175 B1 * | 6/2005 | Clavey | 280/47.24 |
| 6,967,140 B2 | 11/2005 | Doyle | |

OTHER PUBLICATIONS

American Moving Supplies, Online products Web Page -http://www.americanmovingsupplies.com/product_info.php?cPath=23&products_id=42.
New Haven Moving Equipment Corp. Catalog © 2005, pp. 40-45.

* cited by examiner

*Primary Examiner*—Christopher P. Ellis
*Assistant Examiner*—John Walters
(74) *Attorney, Agent, or Firm*—David E Newhouse, Esq.

(57) ABSTRACT

A removable side rack system for typical moving dollies includes two inverted U-shaped frames each having an lockable, articulating stabilizer-support arm anchored to its top crossing bar, an E-track anchor bar spanning between its respective legs and an extending mounting foot at the distal end of each fame leg. Socket brackets secured to lower side members on opposite sides of a moving dolly are adapted to receive and secure the extending mounting feet of the respective U-shaped frames.

10 Claims, 10 Drawing Sheets

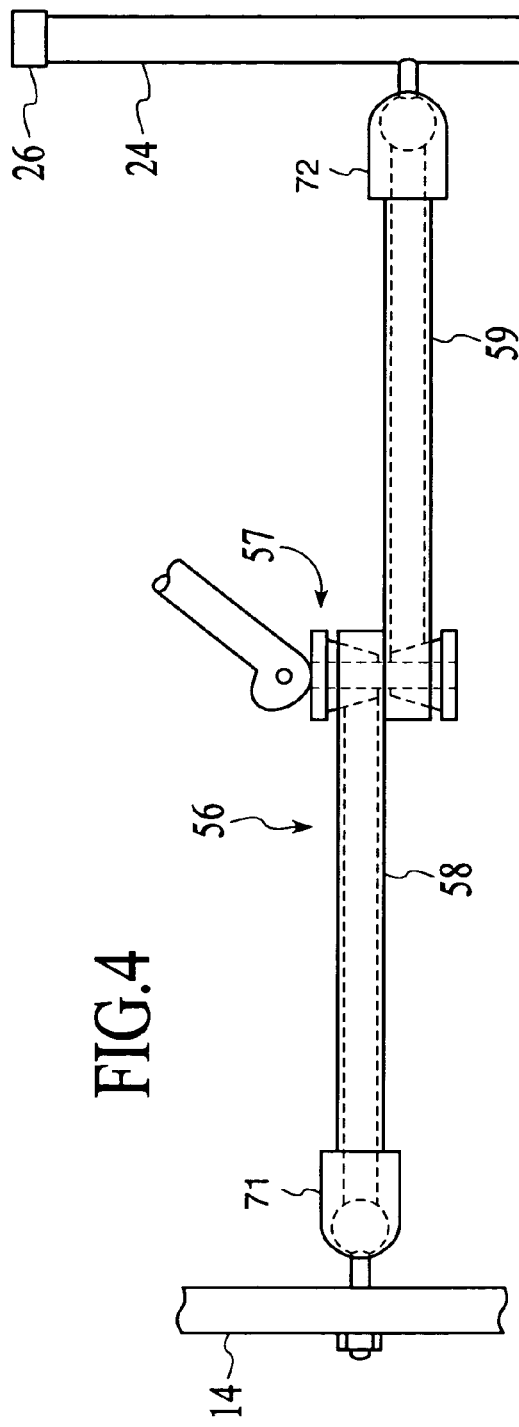
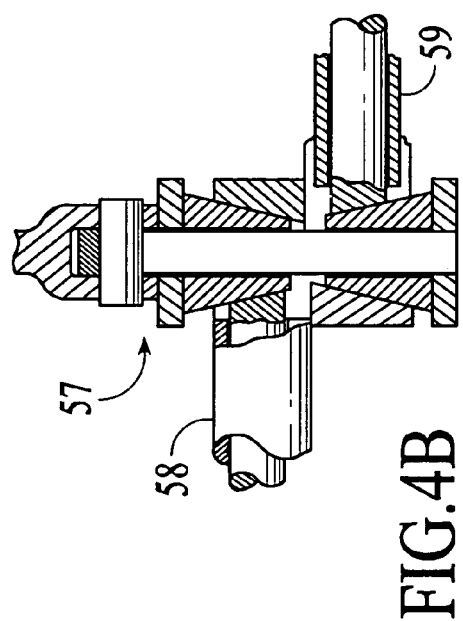
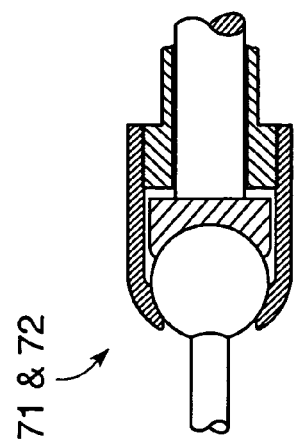
FIG.4
FIG.4B
FIG.4A

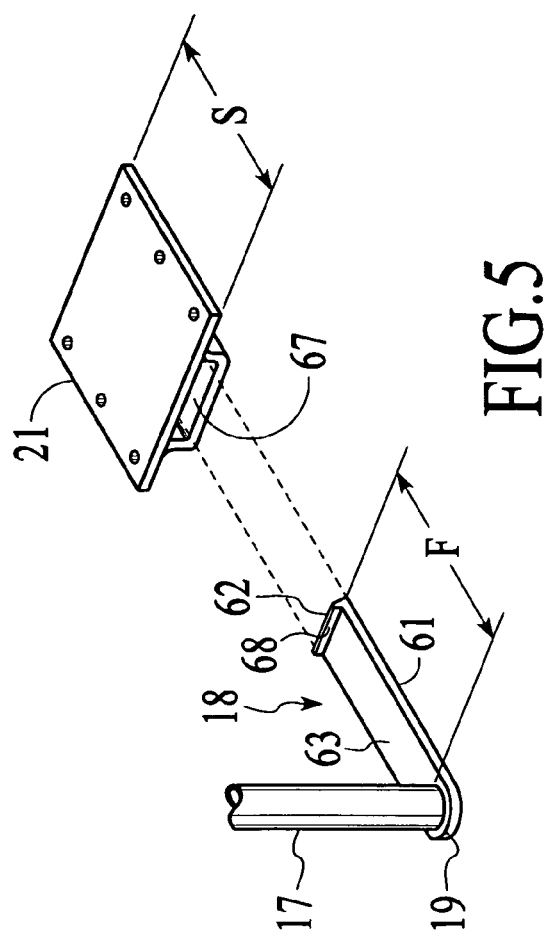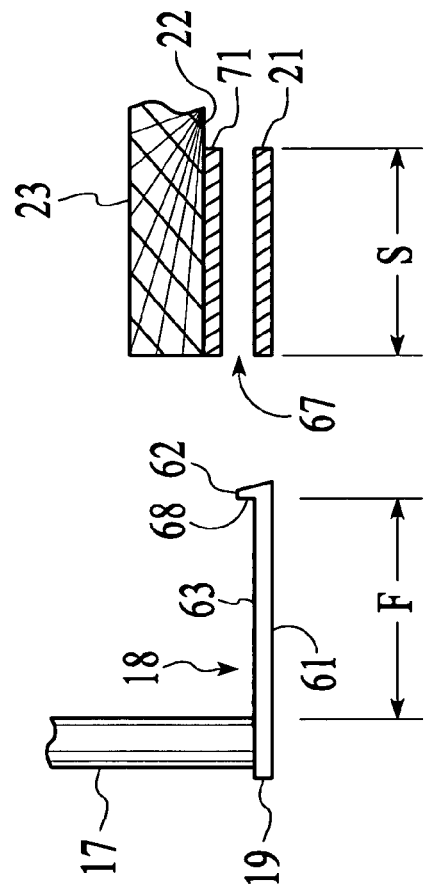
FIG.5
FIG.5A

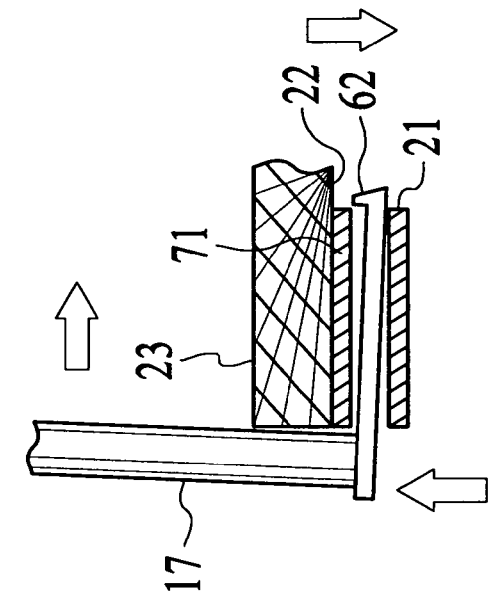
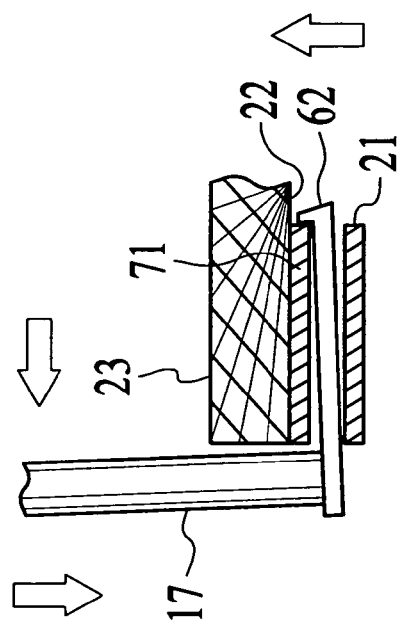
FIG.5B
FIG.5C

REMOVABLE SIDE RACKS FOR A MOVING DOLLY

BACKGROUND OF THE INVENTION

1. Field of the Invention

The invention relates to removable side racks for a typical moving dolly presenting opposed, lockable, articulating stabilizer-support arms.

2. Description of the Prior Art

Typical moving dollies comprise a rectangular platform with swivel casters located proximate each corner sized for allowing easy navigation through doors and hallways in homes and offices. Usually, the dolly platform is provided a pair of longitudinal side members and a pair of crossing perpendicular end members typically secured either above or below the side members. The upper or top member of the dolly platform is typically carpeted presenting an engaging surface that does not damage (furniture) articles placed on the dolly for transport.

Removable side racks for moving dollies are not uncommon. For example, a multipurpose material cart with a 1"×2" 14 gauge rectangular tubing base offered for sale by American Moving Supplies, Inc. has removable side bars that are made of 1¼" 14 gauge round tubing that seat in 4" deep pipe pockets firmly welded to the frame rolling on 6"×2" deluxe gray non-marking casters. U.S. Pat. No. 6,967,140, Neuman describes a modular dolly bed with sockets adapted for mounting removable interlocking cart bars to provide dolly side frames. Then U.S. Pat. No. 6,824,152, Scott describes a dolly with a central base with a pair side rails that translate to sandwich, vertically holding and supporting an article on the base, rolling on casters structurally mounted in the side rails. U.S. Pat. No. Des. 333,200, Berrian, depicts a moving dolly with outwardly inclined side racks one of which appears hinged for pivoting inwardly.

Removable attachments for moving dollies adapting them for carrying planar furniture pieces are also not uncommon. For example, U.S. Pat. No. 5,163,695, Pakowsky, U.S. Pat. No. 4,793,624, Mace, U.S. Pat. No. 5,037,177, Hershberger, and U.S. Pat. No. 1,836,362, Crowley, each describe removable attachments for dollies that structurally support large planar items inclined relative to the dolly platform. U.S. Pat. No. 4,488,733, Hellsten, describes a dolly specifically designed for moving large plates supported inclined on a stand above the rolling plane of the casters where top edges of the plates extending above the stand may be secured by a hook member coupled to the top of the stand.

The problem with supporting and moving planar items inclined relative to the rolling plane of the casters is that the center of gravity/mass of the loaded dolly must in all cases be within a rectangular perimeter defined by the rolling casters, otherwise it will simply topple over. Accordingly, inclinations of either the dolly support platform or the rolling plane as a loaded dolly is handled can cause it to topple.

A third kind of dollies are those that are integrated into the structure of the item or object being moved. For example U.S. Pat. No. 4,921,264, Duffy, describes a dolly adapted for carrying library ranges, and U.S. Pat. No. 5,330,064, Hall, shows a dolly fame integrated with a rack structure.

SUMMARY OF THE INVENTION

The invented removable side rack system for typical moving dollies includes two inverted U-shaped side frames, each having a locking and releasing, articulating, stabilizer-support arm fastened to its top crossing bar, an E-track anchor bar spanning between its respective legs and an extending mounting foot at the distal end of each fame leg. Mounting brackets secured to under the side members on opposite sides of a moving dolly define sockets to receive secure and release the extending mounting feet of the respective U-shaped frames.

The primary advantage of the invented moving dolly side rack system is that the side frames are easily mounted and removed, eliminating the inconvenience of having to load or place planar articles on the dolly between restricting side racks. In particular, a planar article may be placed edgewise on the dolly and supported, leaning one face against a pre-set articulating stabilizer-support arm of a side mounted frame on one side of the moving dolly whereupon the remaining side frame is mounted on the other side of the dolly, and its articulating stabilizer-support arm ratcheted into contact with the opposite face of the planar article for supporting the article vertically on edge between the articulating arms during handling and transport. On unloading, a side frame may be removed from one side of the dolly, and the planar article and unloaded, all without having to move the article from between the dolly side racks.

Embodiments of the invented moving dolly side rack system with ratcheting stabilizer-support arms have the advantage of allowing a single mover to load, transport and unload planar articles with the dolly, using one hand to swing the arms inward and upward, to engage, stabilize and hold a planar article being held with the other hand in a vertical edgewise position on the dolly platform, and then before unloading, to release the ratchets with one with one hand allowing the arms to swing downward and outward while stabilizing the article in its vertical edgewise position on the dolly with the other hand.

Another embodiment of the invented moving dolly side rack system relate contemplates lockable, jointed structures as stabilizing arms on the side racks for supporting articles on the dolly as they are being handled and moved about. In particular, such jointed structures include a central ratcheting or locking elbow joint with two extending arms, at least one ending with a lockable pivot joint, either fastened to the top bar of a side frame or to a contact member, with an internal mechanical linkage for simultaneously locking the elbow joint and pivoting joints in set positions.

Another feature of the invented moving dolly side rack system relates to a land on the upper surface at the tip of the mounting foot at the end of the fame legs for engaging in a bracket socket to hold the foot in the socket responsive to forces tending to rotate or spread the mounted dolly side frames outward.

The invented moving dolly side rack system also allows advantageous use of straps with conventional E-track couplers fastened to E-track anchor bars for further stabilizing and holding large planar articles on the dolly during handling and transport. The E-track anchor bars also stiffen the side frames against shear forces acting in the plane of the frames

BRIEF DESCRIPTION OF THE FIGURES

FIGS. 4, 4a, & 4b present cross sections views of a typical jointed arm structure that can functioning as the locking and releasable stabilizer-support arm fastened to the top crossing bar of the removable side rack for a moving dolly.

FIGS. 5, 5a, 5b, & 5c illustrate the functional details of the side rack mounting foot and the receiving socket secured to the underside of a side fame member of a typical moving dolly.

DESCRIPTION OF PREFERRED AND EXEMPLARY EMBODIMENTS

Figure 1:
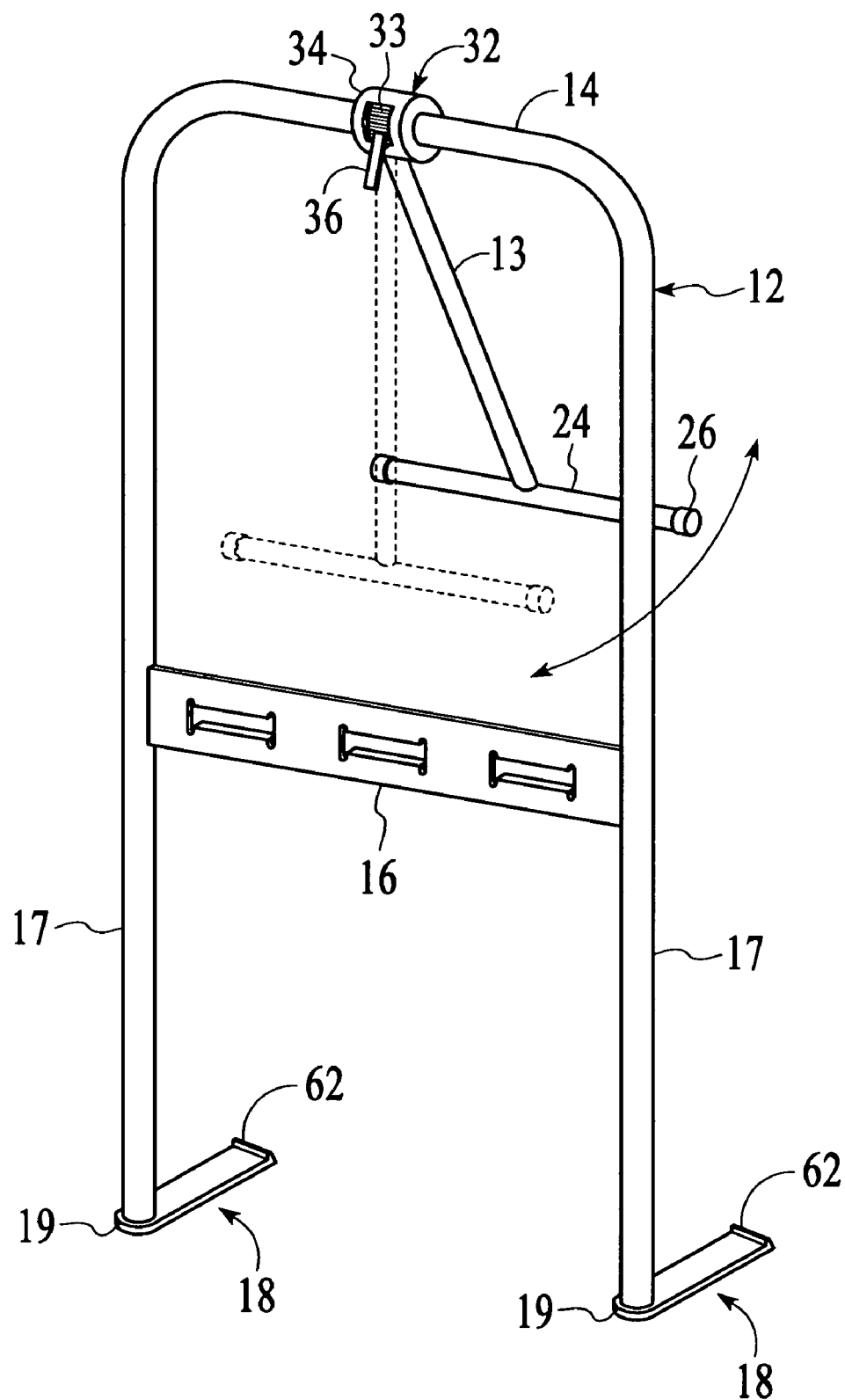
FIG. 1 presents a perspective view of an embodiment of the invented removable side rack for a moving dolly.
Figure 6:
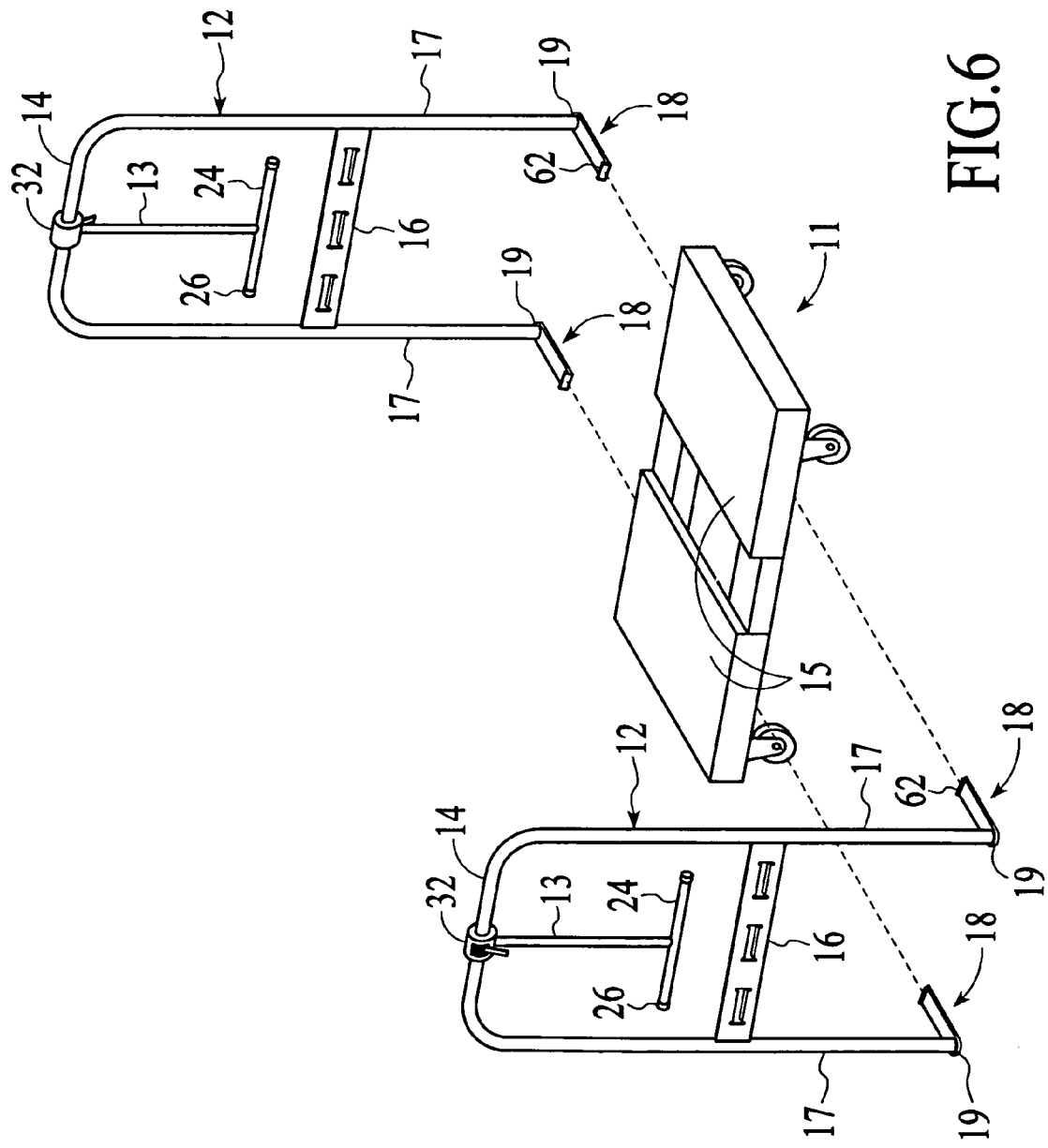
FIG. 6 is a perspective of a moving dolly and the invented side racks before being mounted.
Figure 7:
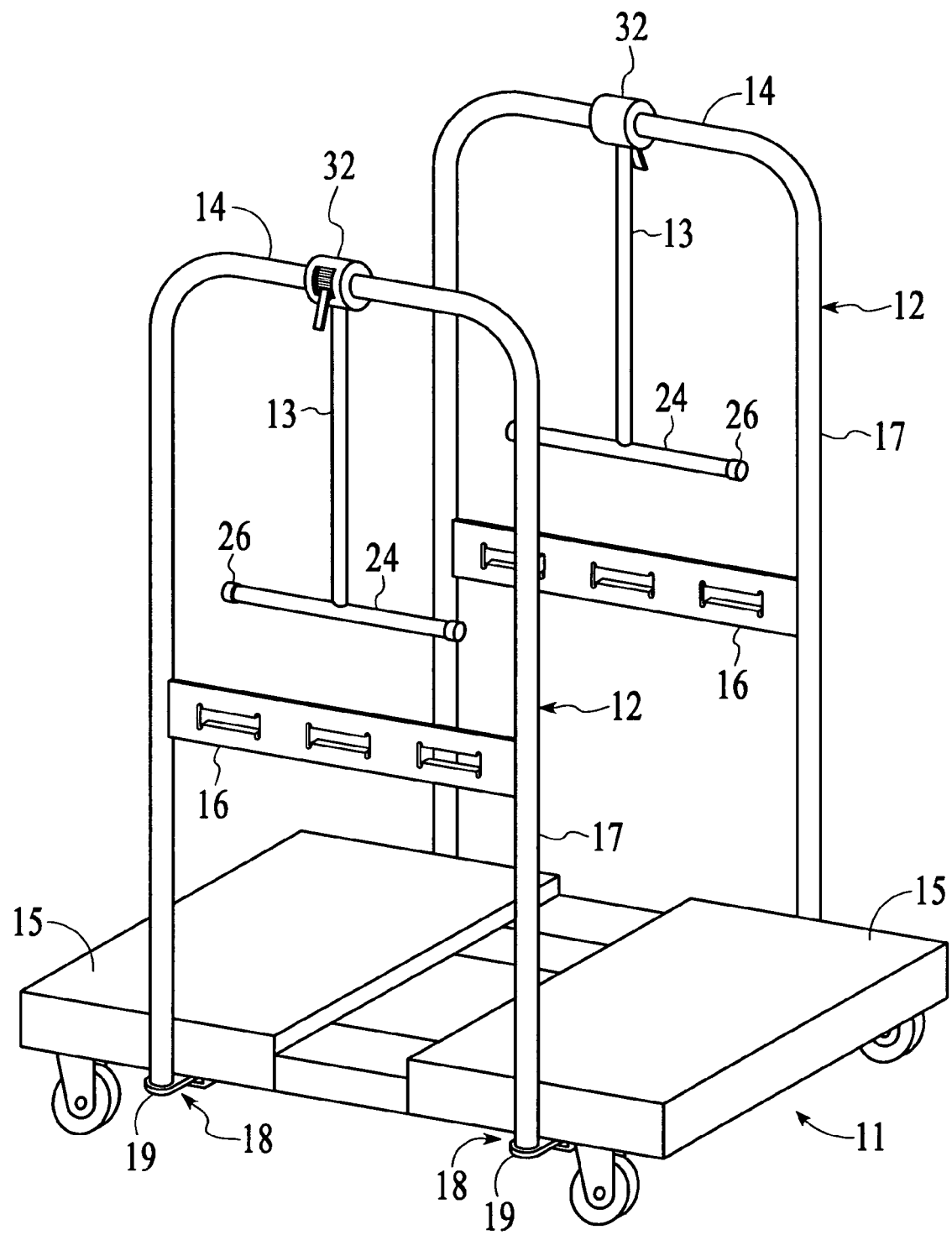
FIG. 7 is a perspective view of a typical moving dolly with the invented removable side racks mounted.
Figure 8:
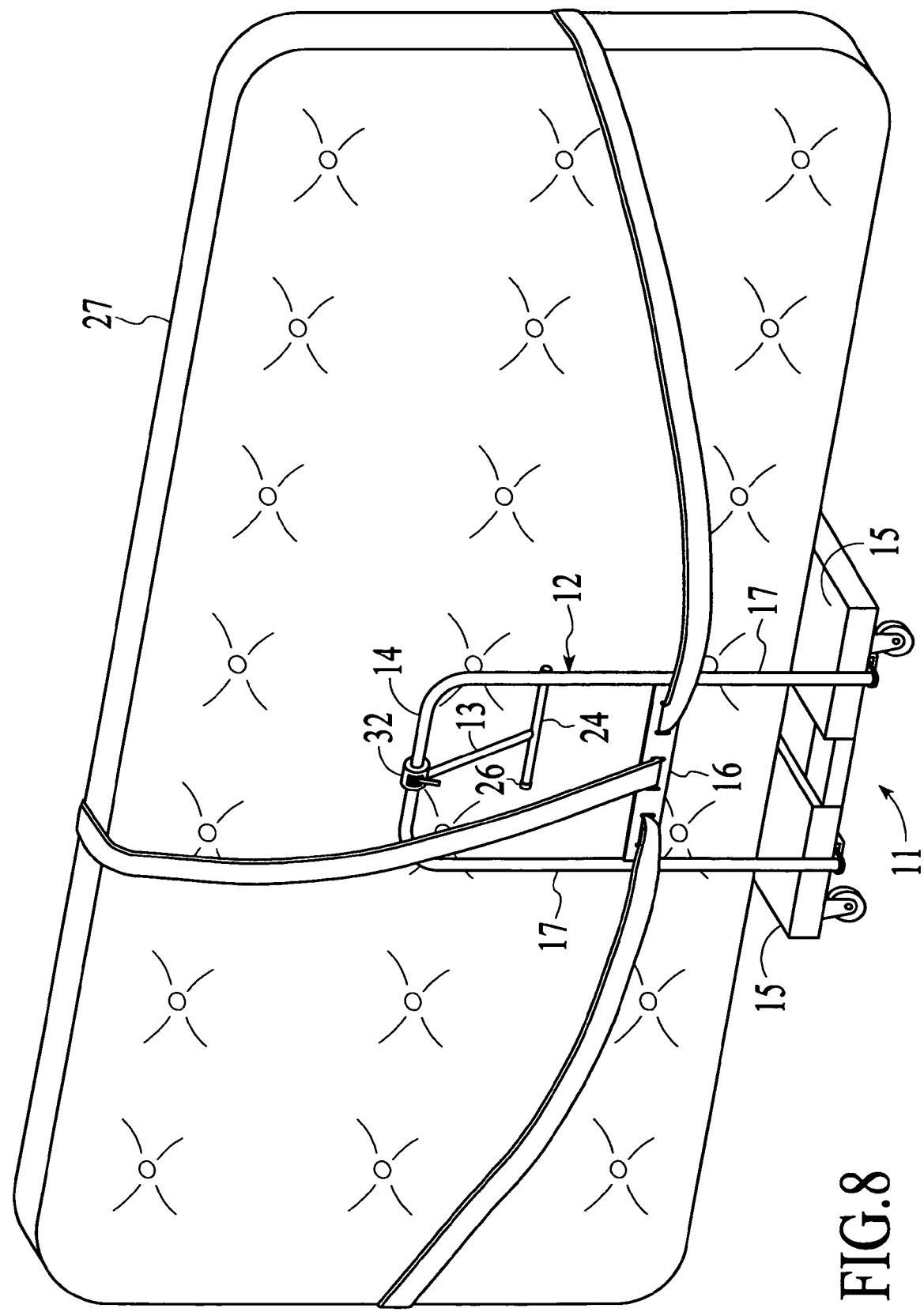
FIGS. 8 & 9 show perspective views illustrating cumbersome planar articles loaded for handling and transport on typical moving dollies equipped with the invented removable side racks.
Figure 9:
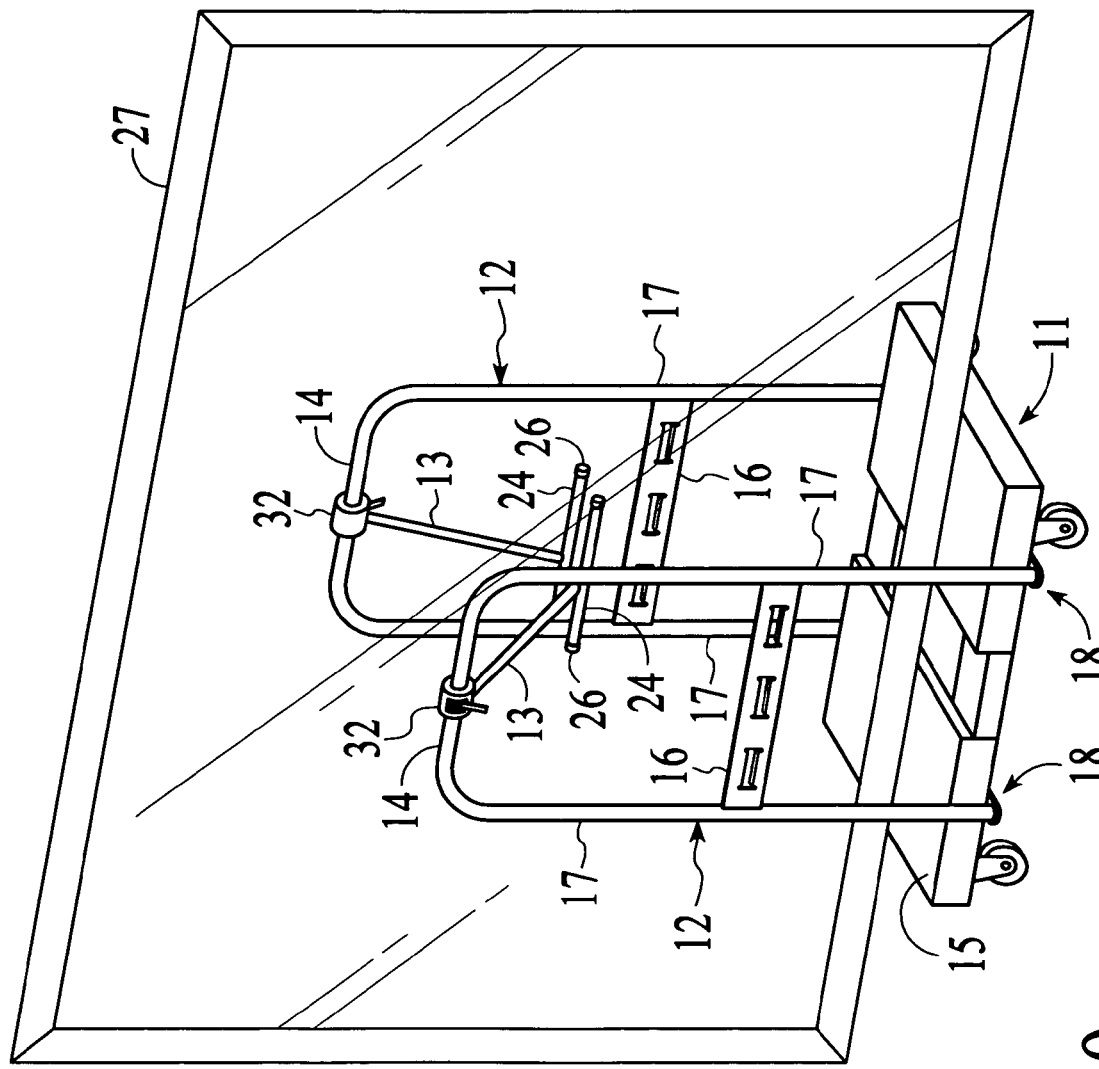

Looking at FIGS. 1, 6 and 7, the invented removable side rack system for typical moving dollies 11 (FIGS. 6 & 7) includes two inverted U-shaped side frames 12, each having a locking and releasing, articulating stabilizer-support arm 13 fastened to its top crossing bar 14, an E-track anchor bar 16 spanning between its respective legs 17 and an extending mounting foot 18 at the distal end 19 of each side fame leg 17. Socket brackets 21 (see FIG. 5) secured to underside 22 of the side members 23 on opposite sides of a moving dolly 11 are adapted to receive, secure and release the extending mounting feet 18 of the respective U-shaped frames 12. The locking and releasing, articulating stabilizer-support arm 13 fastened to the top crossing bar 14 of each inverted U-shaped side frames 12 has a furniture contact member 24 at its end. As illustrated, the preferred furniture contact member 24 is a bar structurally fastened at the end of the arm 13 aligned parallel to the top crossing bar 14 of the particular inverted U-shaped side frame with rubber or plastic bumper end caps 26 for cushioning between each contact member 24 and planar articles 27 (see FIGS. 8 & 9) supported for handling and transport on the moving dolly 11 between the stabilizer-support arms 13.

Figure 2A:
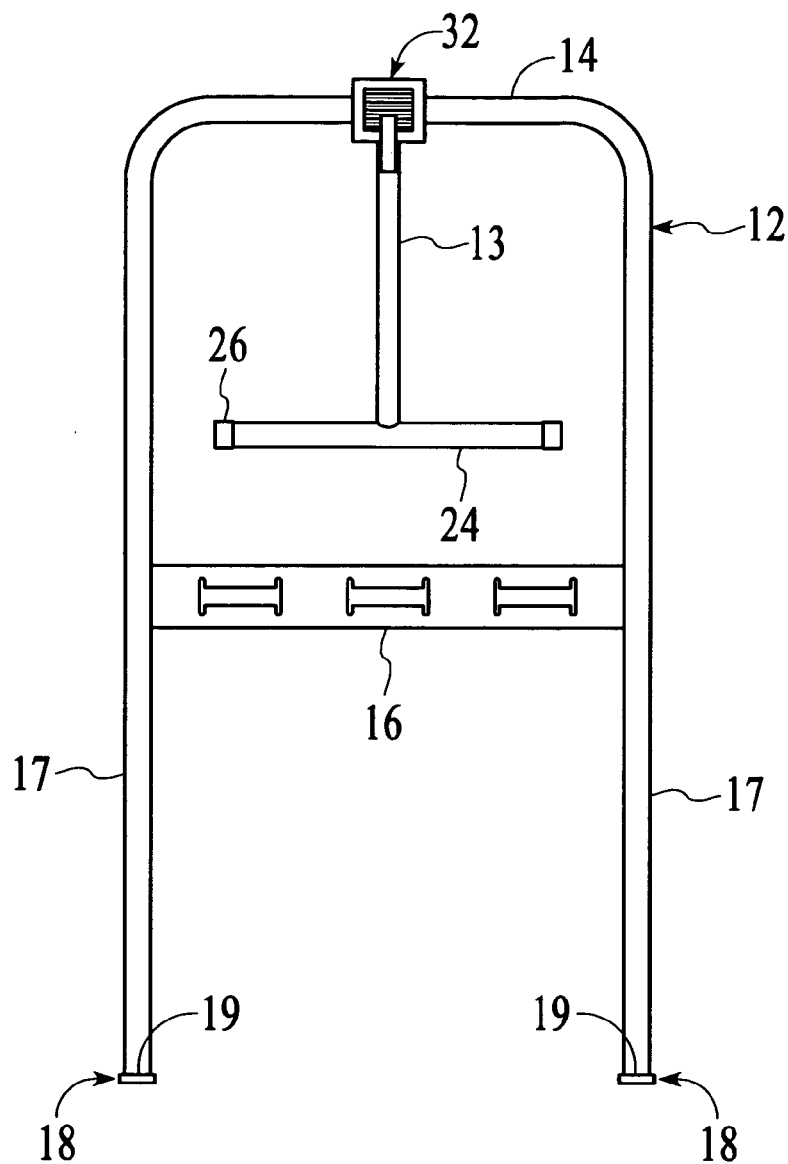
FIGS. 2a & 2b presents a side elevation view of the invented removable side rack with an articulating ratchet arm fastened to and ratcheting around the top cross bar of the inverted U-shaped side frame and an enlarged view of the releasing ratcheting mechanism and the top crossing bar of the side rack.
Figure 2B:
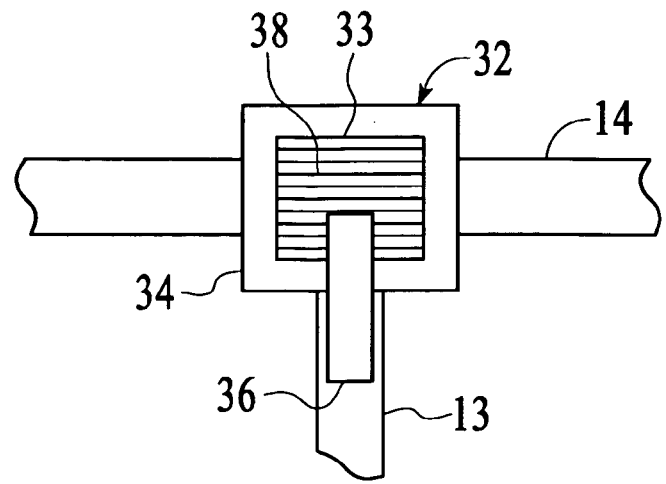

FIG. 2 shows an embodiment of a removable side rack 12 with an articulating ratchet arm 13 fastened to and ratcheting around the top cross bar 14 of the inverted U-shaped side frame 12. In this embodiment, ratcheting mechanism 32, shown enlarged in FIG. 2a is conventional, indicated by a stationary ratchet toothed gear 33 coaxially secured around the top cross bar 14 and ratchet collar 34 journaled for rotation around the cross bar 14 straddling the gear 33. A spring biased, manual ratchet release mechanism 36 is mounted on the ratcheting arm 13 and collar 34 for normally engaging and slipping over the teeth 38 of the gear 33 allowing the arm 13 to rotate inwardly and preventing it from rotating outwardly. The spring biased manual release mechanism 36 is manually moved against the spring bias to release engagement with the teeth 38 of the toothed ratchet gear 33 allowing the articulating arm 13 to pivot or rotate outwardly. A skilled ergonomic designer should locate and orient the spring biased, manual ratchet release mechanism 36 on the ratcheting arm 13 optimally for allowing one-hand operation by a mover, enabling the mover to steady the article on the moving dolly with the other hand.

Figure 3A:
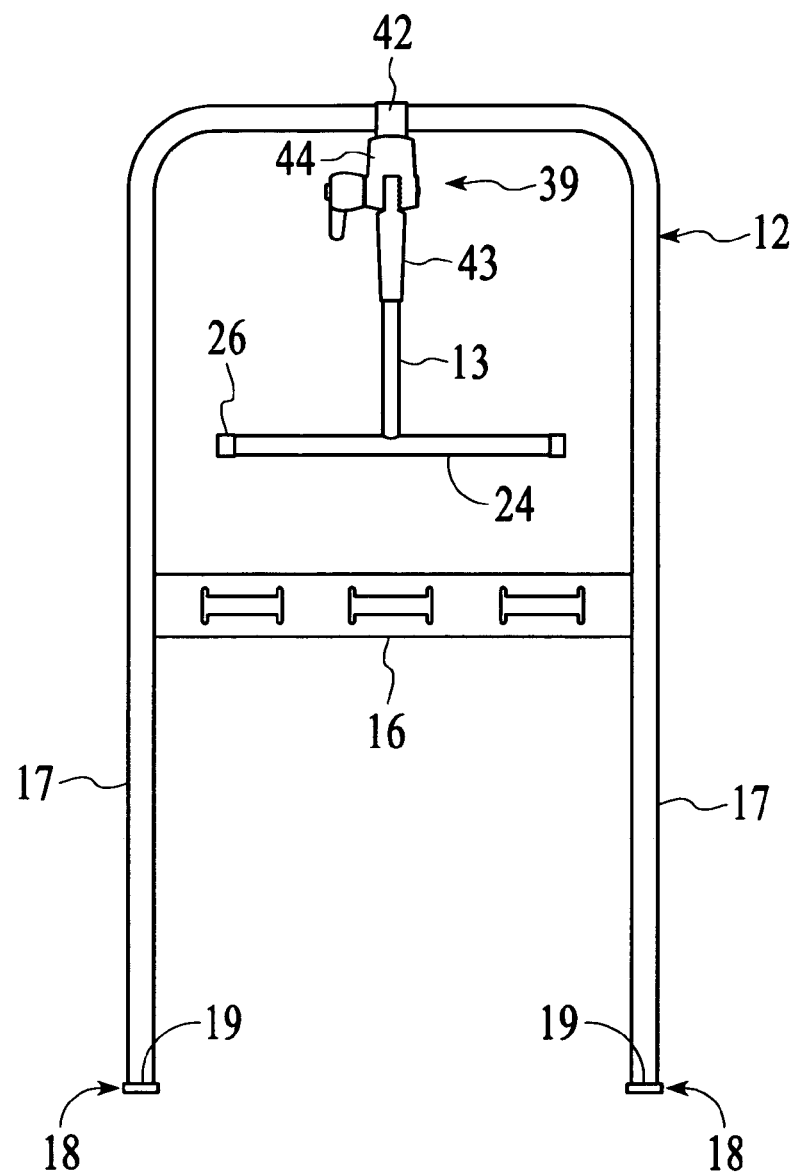
FIGS. 3a & 3b presents a side elevation view of the invented removable side rack with a cam-lever lockable articulating stabilizer-support arm fastened to the top crossing bar of the side rack and an enlarged view of the cam-lever lockable elbow joint of stabilizer-support arm and the top crossing bar of the side rack.
Figure 3B:
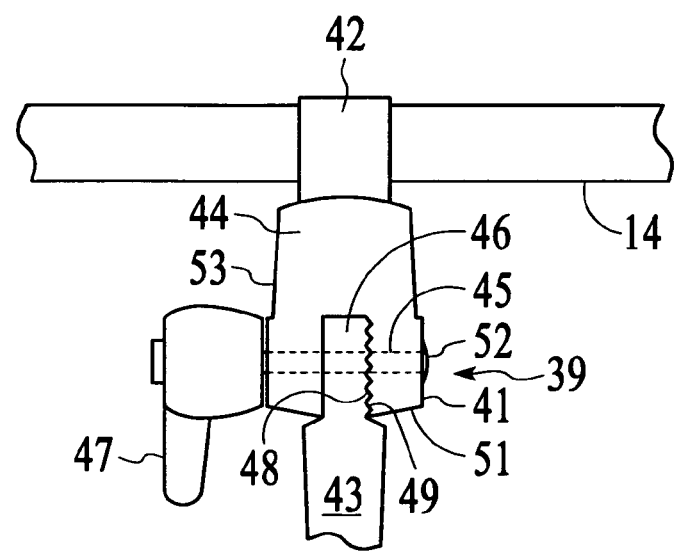

FIG. 3 shows a removable side rack 12 with a cam-lever, lockable articulating stabilizer-support arm 39 fastened to the top crossing bar 14 of the U-shaped side frame 12. In this embodiment, the elements of conventional locking articulating elbow joint 41 are shown with a stationary shoulder arm 42 structurally fastened to the top crossing bar 14 of side frame 12 extending downwardly in the plane of the inverted U-shaped side frame 12, and forearm 43 pivoting perpendicularly inwardly and outwardly with respect to the plane of the inverted U-shaped side frame 12. The elements of the elbow joint 41 (FIG. 3a), include a compressible yoke 44 integral with the shoulder arm 42, a tension shaft 45, a forearm journal 46 integral with the forearm 43 and a cam leaver 47. As shown, the forearm journal 46 is sandwiched within the yoke 44 journaled for rotation around the tension shaft 45 supported within the yoke 44 and presents at least one annular face with radial saw-tooth striations or grooves 48 for engaging complementary radial saw-tooth striations or grooves 49 on at least one adjacent face 51 of the sandwiching yoke 44. The tension shaft 45 extends though supported by the yoke 44 and is anchored at one end outside the yoke 44 by a head 52, and at the other end by a pivotally attached cam lever 47, that rotates a camming surface against an outside face 53 of the yoke 44 for mechanically clamping the forearm journal 43 in place at any desired position within the yoke 44.

FIGS. 4, 4a, & 4b present cross sections views of a typical jointed arm structure 56 that can functioning as a locking and releasable stabilizer-support arm fastened to the top crossing bar 14 of the U-shaped side frame 12. Detailed descriptions of the different functional elements of suitable jointed arm structures 56 can be found in U.S. Pat. No. 3,240,516, E. Barish et al, U.S. Pat. No. 4,236,844, Mantele, U.S. Pat. No. 4,431,329, Baitella, U.S. Pat. No. 5,092,551, Meier, and U.S. Pat. No. 6,575,653, Kräuter, all of which are incorporated by reference into this disclosing specification as though fully set forth at this point herein.

Looking at FIGS. 4, 4a, & 4b (modified from E. Barish et al, supra) the basic elements of a jointed arm structure 56 suitable for the invented removable side racks for a moving dolly include a locking and releasing elbow joint mechanism 57 joining two limbs 58 and 59 that pivot in one plane relative to each other, one pivotally fastened to the top cross bar 14 of a U-shaped side frame 12, the other extending, and pivotally fastened to a contact member 24 for engaging an available surface of an article 27 placed on the moving dolly 11. A lockable, universal pivoting, shoulder-coupling 71 fastens the jointed arm structure limb 58 to the top cross bar 14. A lockable, universal pivoting, wrist-coupling 72 fastens the jointed arm structure limb 59 to the contact member 24. A manual locking mechanism includes mechanical linkage allowing for simultaneously setting and releasing the elbow joint mechanism 57 and the respective universal, pivoting, shoulder-coupling and wrist-coupling 71 & 72 to and from set positions.

The advantages of jointed arm structures as the locking and releasing, articulating, stabilizer-support arms for the invented removable side racks for moving dollies relate to stabilizing, supporting and holding articles on a moving dolly that do not present surfaces oriented parallel to the plane of the inverted U-shaped side frames mounted on the moving dolly. In particular, the joint arm structures allow a mover to position the respective contact members against any available surface areas presented by an article placed on the dolly, and then orient, and lock the respective jointed arm structures relative to the respective engaged contact surfaces for optimally supporting and holding the article on the dolly for transport and handling.

Looking now at FIGS. 5, 5*a*, 5*b*, & 5*c*, mounting feet 18 of the invented removable side rack extend perpendicularly inward relative to the plane of each inverted U-shaped side frame (not shown) at the end of each side frame leg 17. The mounting foot 18 is preferably a flat, hexahedral beam 61 of a structural material such as steel, welded at its proximal end at the end of a side frame leg 17, with a land 62 extending upward from its top surface 63 at its distal tip. The mounting feet 18 are received in sockets 67 provided by brackets 21 fastened to the undersides, proximate the outside edges of the side frame members 23 of the moving dolly 11. The brackets 21 each have a rectangular socket 67, having dimensions slightly greater than the cross-section dimensions of the flat hexahedral beam 61 and land 62. The length F of the flat hexahedral beam 61, measured from the base of the side frame leg 17 to the proximal vertical face 68 of the land 62 is greater than a distance S measured from the edge of side dolly frame members 23 to inner end 71 of the bracket socket 67 so that the distal tip with land 63 of mounting feet 18 extends all the way through the respective receiving sockets 67 of brackets 21 when a side frame 12 is mounted. Accordingly, as indicated by the arrows in FIG. 5*b*, forces tending to push an inverted U-shaped side frame 12 outward will drive the tip of the mounting feet 18 received in sockets 67, upward for engaging the vertical face of the land 62 within the socket 67 preventing the respective mounting feet from sliding out of the sockets 67. Conversely, as indicated by the arrows in FIG. 5*c*, forces tending to push an inverted U-shaped side frame 12 inward over the dolly platform 15 will drive the tip of the mounting feet 18 received in sockets 67 downward releasing engagement of the land 62 within the socket 67. An ergonomic designer should recognize that these described features of the side frame mounting feet 18 and brackets 21 enable the inverted U-shaped side frames to be easily mounted and dismounted from a so equipped moving dolly by simply tipping the inverted U-shaped side frames 12 inward slightly with respect to the of the dolly platform 15 before inserting or withdrawing the mounting feet 18 into or from the respective bracket sockets 67. Once mounted, gravity will engage the mounting feet 18 within the bracket sockets 67.

The ergonomic designer should also appreciate that these described features of the mounting feet 18 interact with operational features of the opposed locking and releasing, articulating, stabilizer-support arms 13 fastened to the top crossing bars 14 of the mounted inverted U-shaped side frames 12 mounted on opposed sides of the dolly 11. In particular, looking at FIGS. 1, 7, 8 & 9, the opposed articulating, stabilizer-support arms 13 of the side frames 12 pivot inwardly and upwardly with regard to the support platform 15 of the dolly 11 into engagement with opposite side surfaces 71 of articles 27 placed on the dolly platform 15. Accordingly forces tending to vertically separate an article placed on the dolly platform 15 supported between the opposed locking and releasing, articulating, stabilizer-support arms 13 engaging the opposite surfaces 71 thereof will pivot the engaged arms 13 inward and upward providing a compressive force tending to spread the inverted U-shape side frames 12 apart. This compressive force has the advantage holding the dolly 11 and article 27 together during handling and transport, allowing movers to lift the ends of such articles 27 extending beyond the dolly platform and carry not only the article 27, but also the dolly below the article. This feature eliminates the necessity, in many cases, of having to unload and reload an article from and onto the dolly when negotiating stairs and ramps.

It should be appreciated that many modifications and variations of the essential elements of invented removable side rack system can be made both with respect to the removable side racks described and associated articulating arms structures which, while not described above, do fall within the spirit and scope of the invention as set forth in the appended claims.

I claim:

1. Removable side racks for a moving dolly comprising in combination:
   a) two inverted U-shaped side frames having a top crossing bar and mounting feet terminating each fame leg perpendicularly extending with respect to a plane framed on three sides by the particular U-shaped side frame;
   b) a locking and releasing articulating arm fastened to each top cross bar of each inverted U-shaped side frame, and pivoting perpendicularly with respect to, and within the plane framed by the particular U-shaped side frame, the articulating arm having a length ranging from one half (½) to three quarters (¾) of a distance perpendicularly measured between the planes framed by the U-shaped side frames when mounted on opposite sides of the moving dolly;
   c) brackets secured to opposing sides of the moving dolly providing sockets for receiving, holding and releasing the perpendicularly extending mounting feet of a U-shaped side fame member, whereby the U-shaped side frames may be easily mounted on and removed from opposing sides of the moving dolly.

2. The removable side racks of claim 1 wherein the locking and releasable articulating arm comprises a ratchet arm fastened to and rotationally ratcheting axially around the top cross bar of the inverted U-shaped side frame perpendicularly within the plane framed by the particular U-shaped side frame.

3. The removable side racks of claim 1 or 2 further including an E-track anchor bar structurally spanning between the frame legs of each side frame.

4. The removable side racks of claim 1 wherein the locking and releasing articulating arm comprises a locking and releasable elbow joint with two limbs, one structurally fastened to the top crossing bar of a side frame, the other extending, and pivoting inwardly for contact with an article placed on the moving dolly, and means for setting and releasing the elbow joint to and from a set position, whereby the articulating arms of the respective side frames can be folded into contact with an article placed on the moving dolly on opposite sides and locked for positioning, stabilizing and supporting the article on the dolly between the side frames and then released for unloading the article from the moving dolly.

5. The removable side racks of claim 1 or 2 wherein each extending mounting foot terminating each frame leg has an upward engagement land proximate its tip, and forces tending to rotate the mounted inverted U-shaped side frames outward spreading them apart, rotate the respective lands of each mounting foot into engagement within the particular receiving sockets, while forces tending to rotate a mounted inverted U-shaped side frame inward, toward the opposite side of the dolly, rotate the respective lands of each mounting foot out of engagement within the particular receiving sockets allowing the particular inverted U-shaped side frame to be removed from the dolly.

6. The removable side racks of claim 4 wherein the locking and releasing articulating arm further includes a lockable pivoting shoulder coupling fastening the one limb to the top crossing bar of a side frame, and mechanical linkage means for simultaneously locking the pivoting shoulder coupling and a ratcheting elbow joint in set positions.

7. The removable side racks of claim 4 wherein the locking and releasing articulating arm further includes a lockable pivoting wrist coupling fastening the other limb to a contact member, and mechanical linkage means for simultaneously locking the pivoting wrist coupling and the elbow joint in set positions.

8. The removable side racks of claim 6 wherein the locking and releasing articulating arm further includes a lockable pivoting wrist coupling fastening the other limb to a contact member, and mechanical linkage means for simultaneously locking the pivoting shoulder coupling, the pivoting wrist coupling and the ratcheting elbow joint in set positions.

9. The removable side racks of claim 4 wherein the other limb extending from the elbow joint further includes a contact member at its end.

10. The removable side racks of claim 9 wherein the contact member comprises a bar with cushioning, friction bumper end caps of a larger cross-section dimension at its ends, the bar being oriented parallel with respect to the cross bar of the particular inverted U-shaped side frame and being fastened proximate its center to the other limb of the elbow joint.

* * * * *